US005428827A

United States Patent [19]

Kässer

[11] Patent Number: 5,428,827

[45] Date of Patent: Jun. 27, 1995

[54] RADIO RECEIVER WITH A RADIO DATA SIGNAL (RDS) DECODER

[75] Inventor: Jürgen Kässer, Diekholzen, Germany

[73] Assignee: Blaupunkt-Werke GmbH, Hildesheim, Germany

[21] Appl. No.: 735,059

[22] Filed: Jul. 24, 1991

[30] Foreign Application Priority Data

Aug. 1, 1990 [DE] Germany ........................ 40 24 366.4

[51] Int. Cl.[6] ................................................ H04B 1/16

[52] U.S. Cl. .............................. 455/161.3; 455/166.1; 455/186.1

[58] Field of Search ...................... 455/32.1, 45, 161.1, 455/161.2, 161.3, 164.1, 164.2, 165.1, 166.1, 166.2, 185.1, 186.1, 228

[56] References Cited

U.S. PATENT DOCUMENTS

| | | | |
|---|---|---|---|
| 4,392,247 | 7/1983 | Van Deursen | 455/161.2 |
| 4,450,589 | 5/1984 | Ekers et al. | 455/45 X |
| 4,862,513 | 8/1989 | Brägas | 455/45 |
| 5,170,487 | 12/1992 | Peek | 455/45 |

FOREIGN PATENT DOCUMENTS

| | | | |
|---|---|---|---|
| 0136829 | 6/1988 | Japan | 455/185.1 |

OTHER PUBLICATIONS

Specifications of the Radio Data System (RDS) for VHF/FM Sound Broadcasting (EBU Technical Centre, Brussels, Mar. '84), pp. 1, 14–17 and 29–31.

*Primary Examiner*—Edward F. Urban

*Attorney, Agent, or Firm*—Frishauf, Holtz, Goodman & Woodward

[57] ABSTRACT

A radio data system (RDS) receiver has a station selector circuit including a microprocessor, several Alternative Frequency (AF) memory cells, and at least one learning memory cell associated with each AF memory cell. In a preferred embodiment, a counter is associated with each learning memory cell. The AF memory cells store alternative frequencies decoded from a Radio Data System signal. As each station is tuned successfully, i.e. with adequate signal strength, its frequency is stored in one of the learning memory cells. When signal deterioration requires a skip to a new frequency, the "skip frequencies" stored in the learning memory cells are preferred to other frequencies. The counters keep track of how many times, since power-up, each frequency has been successfully tuned, and the frequency with the highest count is the "most preferred" alternative frequency.

2 Claims, 1 Drawing Sheet

RADIO RECEIVER WITH A RADIO DATA SIGNAL (RDS) DECODER

CROSS-REFERENCE TO RELATED LITERATURE

European Broadcasting Union Technical Standard 3244-E, entitled SPECIFICATIONS OF THE RADIO DATA SYSTEM (RDS) FOR VHF/FM SOUND BROADCASTING (EBU Technical Centre, Brussels, Mar. '84, 60 pp.); European Patent Application 86-105467.4, Apr. 21, 1986, HEGELER, published Nov. 12, 1986 as European Patent Pub. 0 200 977 A2, corresponding to DE-OS 35 16 282, filed May 7, 1985.

CROSS-REFERENCE TO RELATED PATENTS AND APPLICATIONS

Of Robert Bosch GmbH and its subsidiary Blaupunkt Weke GmbH, the disclosures of which are hereby incorporated by reference: U.S. Pat. No. 3,949,401, HEGELER et al., issued Apr. 6, 1976, entitled FREQUENCY IDENTIFICATION CIRCUIT FOR BROADCAST TRAFFIC INFORMATION RECEPTION SYSTEMS; U.S. Pat. No. 3,568,065, PAGANY; U.S. Pat. No. 4,435,843, EILERS & BRAEGAS, issued Mar. 1984; U.S. Pat. No. 4,450,589, EILERS & BRAEGAS, issued May 1984; U.S. Pat. No. 4,499,603, EILERS, issued Feb. 12, 1985; U.S. Pat. No. 4,862,513, BRAEGAS, issued Aug. 29, 1989; entitled RADIO RECEIVER WITH TWO DIFFERENT TRAFFIC INFORMATION DECODERS;

- U.S. Ser. No. 307,353, now U.S. Pat. No. 5,046,127, LUBER et al., TRANSMISSION PATH TESTER FOR BROADCASTING;
- U.S. Ser. No. 307,349, now U.S. Pat. No. 5,060,300, LUBER et al., entitled POWER CONSERVING SYSTEM FOR RADIO ALERT RECEIVERS;
- U.S. Ser. No. 468,703, now U.S. Pat. No. 5,101,357, TEMPELHOF, corresponding to German Disclosure DE-OS 39 04 344;
- U.S. Ser. No. 447,578, now U.S. Pat. No. 5,181,208, DUCKECK;
- U.S. Ser. No. 447,165, now U.S. Pat. No. 5,064,452, DUCKECK & BRAEGAS;
- U.S. Ser. No. 447,378, now U.S. Pat. No. 5,101,510, DUCKECK;
- U.S. Ser. No. 459,144, now U.S. Pat. No. 5,095,532, MARDUS:
- U.S. Ser. No. 459,147, DUCKECK & BRAEGAS, filed Dec. 29, 1989, based on German pending application P 38 10 177.7, now U.S. Pat. No. 5,020,143, issued May 28, 1991;
- U.S. Ser. No. 459,141, now U.S. Pat. No. 5,193,214, MARDUS, DUCKECK & BRAEGAS, filed Dec. 29, 1989, based on German pending application P 38 10 179.3.

The present invention relates to a novel radio receiver with a radio data signal decoder and memory for the alternative frequency indications in the radio data signal. The primary field of use of the novel radio receiver is in motor vehicles, particularly those which receive traffic information on a data subcarrier signal associated with a regular radio broadcast.

BACKGROUND

An earlier German Patent 39 17 236, HEGELER, describes a radio receiver with a memory in which, along with the program identification (PI) code identifying a certain program, the alternative frequencies assigned to this program are also stored. See EBU Standard 3244-E, pages 14–17 & 29–31. An evaluation memory is also assigned to each memory location for one frequency. A notation is also made in this memory as to how often the various alternative frequencies have recently been selected.

During radio operation on a trip, if one of the rarer alternative frequencies of the desired program has been selected by the automatic transmitter selector and reception of this program becomes worse, the earlier invention offers the possibility of switching the receiver over to the alternative frequency having the greatest coefficient of oftenness, because that is most likely to assure good reception.

THE INVENTION

Given the object of switching directly to the transmitter most likely to have the best reception, the invention provides a different way of attaining this.

Briefly, a learning memory is assigned to each memory for an alternative frequency indication and is set to receive the skip frequency to which the radio receiver is set, after a change has been made.

DRAWINGS

FIG. 1 is a block circuit diagram of the invention; and FIG. 2 shows the subdivision of the memory.

DETAILED DESCRIPTION

Figure 1:
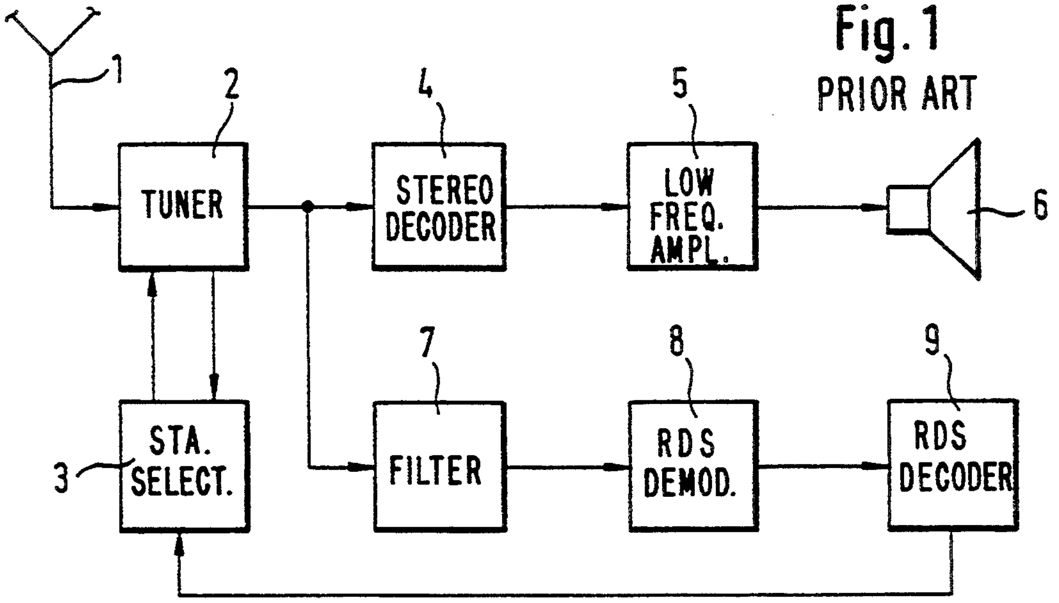
Fig. 1 PRIOR ART

The radio receiver according to the invention is connected to an antenna 1 to receive the carrier frequency of the transmitter to which the tuner 2 is set by an automatic transmitter selector 3. The MPX signal, that is, the modulation of the carrier frequency received, can be heard at the output of the tuner 2. This signal is made audible on the one hand by the loudspeaker 6, via the stereo decoder 4 and the low frequency amplifier 5, and on the other hand is carried to the radio data signal (RDS) decoder 9 via a 57-kHz filter 7 and an RDS demodulator 8. One output of the RDS decoder 9 is connected to a control input of the automatic transmitter selector 3.

The automatic transmitter selector 3 is also connected to one output of the tuner 2 at which a signal relating to the quality of the carrier frequency received, for instance via the field intensity, multipath reception and the like, can be picked up.

The tuner 2 and the automatic transmitter selector 3 thus represent a kind of closed-loop circuit. It serves to select the carrier frequency of a program, once it has been selected, that can be best received and that is identified in the radio data signal by the associated PI code.

As is well known, previously, the radio data signal has been broadcast in Europe in the VHF radio band. VHF carrier frequencies have only a limited reception range. On the other hand, the VHF band has only a limited number of available carrier frequencies. VHF carrier frequencies a certain distance apart are therefore used to transmit different programs. This means that a car radio tuned to a certain frequency would accordingly receive different programs over the course of a long trip. In between, for part of the trip, the quality of the transmitter signal received would leave a very great deal to be desired, or might even disappear completely.

The alternative frequencies (AF) for the radio program selected at a given time, which are jointly broadcast to the radio receiver via the radio data signal, now afford the opportunity to switch to one of the alternative frequencies, as reception of the selected carrier frequency becomes poorer, in the hope that reception will be better on the newly selected carrier frequency. However, before the program in the newly selected alternative frequency is rendered audible, a check must be made as to whether the frequency at the reception site is in fact transmitting the desired program, or whether some other program with a different PI code is already received on this frequency at the reception site. That is, a check, as to whether the PI code is unchanged, must be made. During the period of the check, the car radio is kept silent.

Figure 2:
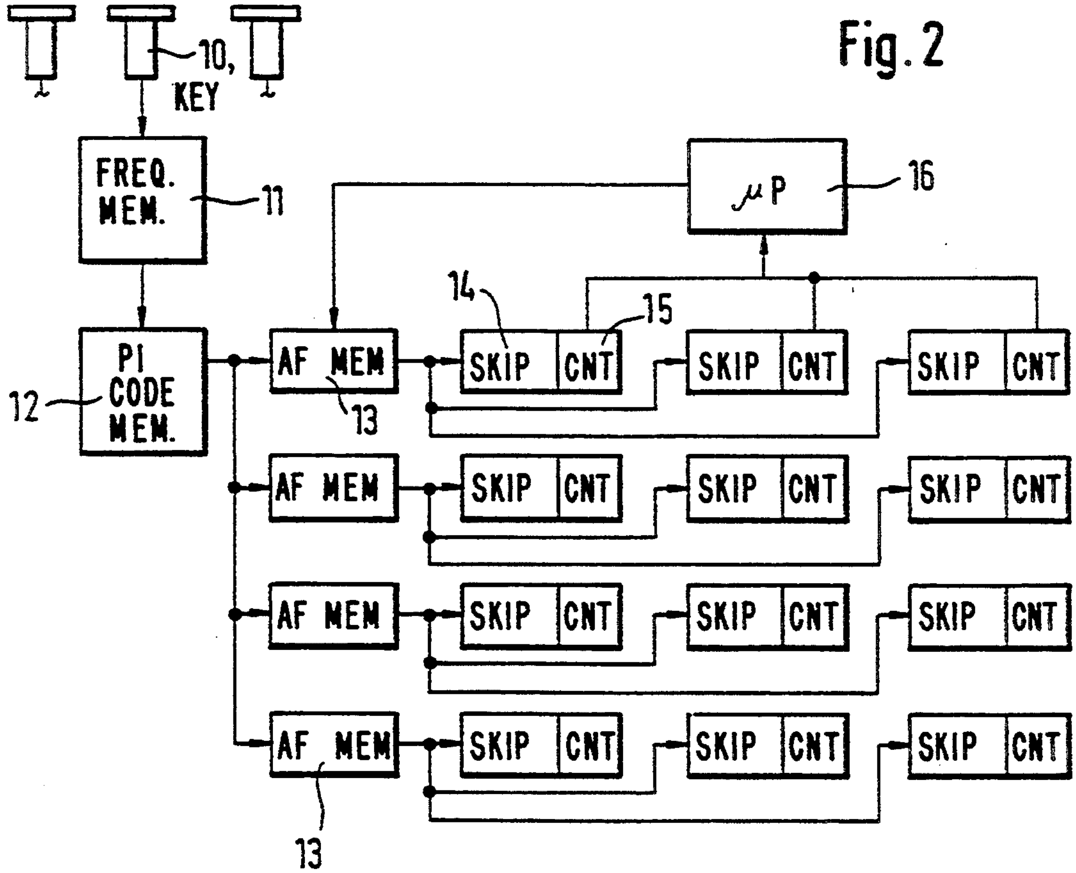

To keep the duration of program interruption as short as possible, the novel radio receiver is provided with additional learning circuits, which cooperate with the memory shown in FIG. 2 as follows.

Each automatic transmitter selector 3 includes a plurality of transmitter keys 10, with which the driver can select certain carrier frequencies in the tuner 2. In a programming step, not described in further detail here, these carrier frequencies are first assigned to the various transmitter keys. This frequency indication is stored in a frequency memory 11.

Once the frequency is selected, however, a certain program is also assigned to the transmitter key 10. Thus each transmitter key 10 also includes a very specific PI code, which can be stored in a PI code memory 12. The alternative frequency indicators belonging to this PI code, for the storage of which an alternative frequency (AF) memory unit 13 is provided, are also transmitted in the radio data signal.

The aforementioned memories are typically integrated with the microprocessor components of the automatic transmitter selector 3.

If the reception quality on the carrier frequency selected with the transmitter key drops below a certain predetermined threshold in the course of a trip, then the microprocessor 16 in the automatic transmitter selector 3 receives a start command from the tuner for starting a program to select an alternative frequency (AF) for the same program that can be received well. In the AF memory, these alternative frequencies are purely randomly arranged in respective memory units 13. The program thus begins upon selection of an arbitrary or randomly selected one of the alternative frequencies. To give some direction to this selection, the automatic transmitter selector 3 according to the invention has learning memories or memory cells 14 for each memorized alternative frequency, which naturally also include the frequency selected using the transmitter key.

These learning memory cell 14 are initially empty. When the reception quality drops below the predetermined threshold for the first time after resetting of the transmitter key, the learning memory 14 that belongs to the previously selected frequency is activated. After the aforementioned random access to or selection of one of the other alternative frequencies, if one with good reception quality is discovered and the tuner is finally set to it, then this skip frequency is fed to the learning memory cells 14.

This process is repeated frequently over a relatively long trip, or in shorter trips in hilly regions. Upon such a change in setting of the tuner 2, the frequency stored in the frequency memory 11 will also be selected once again at some time. If after it has been selected again the reception quality again becomes too weak, .then information is available in the learning memory 14 as to a frequency that should be preferentially selected because the change to this skip frequency has already been successful in the past. It is thus unnecessary to check the PI code of this skip frequency that is now selected again. The newly selected transmitter can thus begin being heard immediately.

If the skip frequency stored in the learning memory 14 cannot be selected at the instantaneous reception site because of poor reception quality, then the program returns to selecting some another alternative frequency.

In a hilly region, it can more often be expected that the skip frequency stored in the learning memory 14 will not be receivable. It is accordingly possible to assign a plurality of learning memories to each alternative frequency. In that case, a counter 15 is suitably connected to each of the learning memories memory cells 14 and counts how often the skip frequency input in the learning memory cell 14 has been successfully selected. Upon the next scheduled frequency skip, the learning memory cell 14 having the highest counter status will then be preferred for the new selection.

As is apparent from this description, it does not matter to the invention whether the contents of the frequency memory 11 were determined when a transmitter key was programmed or were programmed some other time when the radio receiver was manually tuned.

If there is enough memory space, then the radio receiver will, after a relatively long time in operation, have at its disposal a matrix in which the alternative frequencies for each PI code and the skip frequencies assigned to it are listed.

If the driver is in a region in which some other program can already be received on one of the alternative frequencies furnished by the RDS decoder, scanning for this frequency is largely avoided, because this frequency will not be listed as a skip frequency. This is because the input of the skip frequency into the learning memory 14 is not done until the matching of the PI code has also been ascertained the first time an alternative frequency was randomly scanned for.

I claim:

1. A radio receiver according to the radio data system (RDS) standard, having a tuner (2);

a radio data signal decoder (9) coupled to the output of said tuner (2);

an automatic transmitter or station selector (3) having an input coupled to the output of said decoder (9) and having an output coupled to a control input of said tuner (2), for directing said tuner to change from a first reception frequency which has inadequate signal strength for reproduction of a radio program to one of a plurality of alternative reception frequencies having adequate signal strength for reproduction of radio program, wherein each one of the reception frequencies includes a program identification (PI) code, and the program identification codes transmitted at said first and said alternative frequencies are all identical;

a memory means having a plurality of memory units (13), each memory unit storing one of the plurality of alternative reception frequencies, as defined in said RDS standard, decoded from said radio data signal;

a microprocessor (16) in said station selector (3) with a program for changing the tuning of said tuner (2)

to one of the alternative reception frequencies as stored in said memory units (13); and a counter (15) associated with, and coupled to each memory cell (14) to count how often a change to the respective alternative frequency of the associated memory cell (14) is made;

and wherein each said memory units (13) includes at least one respective memory cell (14);

the memory cells (14) of said memory units store the alternative frequency of the respective reception frequency to which the tuning of the tuner is to be changed upon change from the first reception frequency to that one of the alternative reception frequencies having adequate signal strength for reproduction of the radio program, and wherein, when the signal strength of a currently tuned transmitted is below a predetermined threshold level, and a frequency change is therefore necessary, said microprocessor (16) compares respective count values stored in said counters (15) and direct said tuner to tune to that alternative frequency stored in that one of the memory units (13), which is coupled to and connected to the memory cell (14), in which the associated counter (15) has the highest of the count values of all the counters.

2. The radio receiver according to claim 1, wherein a plurality of memory cells (14) are provided forming a group of memory cells, which group of cells is coupled to each memory unit (13).

* * * * *